United States Patent [19]

Breitenfellner et al.

[11] 4,148,955
[45] Apr. 10, 1979

[54] MATT AND SCRATCH-RESISTANT FILMS AND PROCESS FOR THEIR MANUFACTURE

[75] Inventors: Franz Breitenfellner, Bensheim; Roland Fink, Pullach, both of Fed. Rep. of Germany

[73] Assignees: Alkor GmbH, Munich, Fed. Rep. of Germany; Ciba-Geigy AG, Basel, Switzerland

[21] Appl. No.: 841,761

[22] Filed: Oct. 13, 1977

Related U.S. Application Data

[63] Continuation-in-part of Ser. No. 669,783, Mar. 23, 1976, abandoned, which is a continuation-in-part of Ser. No. 524,687, Nov. 18, 1974, abandoned.

[30] Foreign Application Priority Data

Nov. 27, 1973 [DE] Fed. Rep. of Germany ....... 2359060

[51] Int. Cl.$^2$ .................... B32B 5/16; B32B 19/02
[52] U.S. Cl. ................................. 428/143; 264/184; 264/210 R; 428/149; 428/156; 428/324; 428/325; 428/331; 428/474; 428/480
[58] Field of Search ............... 428/143, 149, 324, 325, 428/406, 407, 156; 264/DIG. 6, 184, 109, 210 R; 106/32.5; 35/66

[56] References Cited

U.S. PATENT DOCUMENTS

| 3,100,722 | 8/1963 | Herrmann et al. | 428/325 |
| 3,755,499 | 8/1973 | Heijo et al. | 106/32.5 |

FOREIGN PATENT DOCUMENTS 1504522  1969  Fed. Rep. of Germany.

Primary Examiner—George F. Lesmes
Assistant Examiner—P. J. Thibodeau
Attorney, Agent, or Firm—Luther A. R. Hall

[57] ABSTRACT

Matt films having a scratch-resistant surface are obtained from moulding compositions reinforced with glass spheres if the extruded film is stretched while still in the melt-fluid state, and then allowed to cool. These films are suitable for use as coating materials, especially for furniture, doors and the like.

16 Claims, 1 Drawing Figure

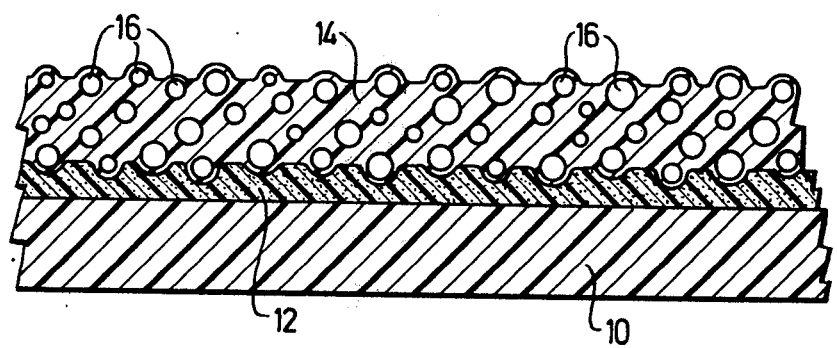

MATT AND SCRATCH-RESISTANT FILMS AND PROCESS FOR THEIR MANUFACTURE

This application is a continuation-in-part application of application Ser. No. 669,783, filed Mar. 23, 1976, now abandoned, which in turn is a continuation-in-part application of application Ser. No. 524,687 filed Nov. 18, 1974, now abandoned.

BACKGROUND OF THE INVENTION

The invention relates to matt and scratch-resistant, amorphous to crystalline films of thermoplastics which are filled with glass spheres.

To manufacture matted films it is customary to convert thermoplastic moulding compositions filled with fillers, for example with titanium dioxide, into films. These films have the disadvantage that the surfaces can be scratched relatively easily, which restricts the range of applications, for example the use as the top layer in a veneering material for furniture or doors.

Thermoplastic moulding compositions which contain glass fibres and/or glass spheres as a reinforcing and filling material are also known. These moulding materials are used for the manufacture of injection mouldings. For example, W. Knöss, Glaskugeln ("Glass Spheres", Industrieanzeiger 93, No. 72, 1971, 1835–1838 and J. Ritter, Applied Polymer Symposium No. 15, 1971, 239–261 describe the general properties of such injection mouldings of polyamides filled with glass spheres and also mention that polyesters can be used as the plastics. Japanese Published Patent 73/05,257 describes moulding compositions of polyethylene terephthalate, reinforced with glass fibres and glass spheres, which are suitable for use in injection moulding, and German 2,206,804 describes polybutylene terephthalates which contain either glass fibres or glass spheres and can also be used for the manufacture of injection mouldings. However, none of these publications mentions that high quality films with certain surface properties can be manufactured from thermoplastic moulding compositions reinforced with glass spheres. Furthermore, so-called "reflecting films", which consist of a thermoplastic and of which the surface is coated with glass spheres, are already known. Since the glass spheres are glued to these films, the scratch resistance of the films is only low.

The German Offenlegungsschrift 1,504,522 describes films of thermoplastics which contain solid particles such as calcium carbonate as a filler. These films are prepared by melt-extrusion and after cooling by stretching them at a temperature above the glass transition temperature, but below a temperature of the polymer being in the melt-fluid state. The main purpose of these matted films is that on the surface of said films it can be written and that the written lines cannot be lightly wiped off. It was found that a full surface mattness of these films is only obtained in using other than glass spheres as a filler. It was also found that with the other fillers, e.g., calcium carbonate, the desired mattness of the films is only obtained when the melt-extruded film is stretched above the glass transition temperature and below the temperature of the polymer melt and that these films have a poor scratch-resistance. It was further found that in embossing these films the desired structures are insufficiently portrayed.

Both the process and the product made therefrom of German Pat. No. 1,504,522 differ significantly from the instant process and product. German Pat. No. 1,504,522 teaches a process to prepare a sheet or film of a thermoplastic composition containing a thermoplastic and a filler such as mica, glass, titanium dioxide or particularly calcium carbonate which comprises (a) extruding the thermoplastic composition in a conventional manner; (b) taking up the sheet or film at a temperature below the glass transition temperature of the thermoplastic with the sheet or film being obtained in a relatively unstretched state and with a smooth surface having no projections or domes arising therefrom as seen by FIG. 1 of German Pat. No. 1,504,522, and (c) stretching in either an integrated third step or in an entirely separate operation isolated from the above extruding and taking up steps in both location and/or time by reheating the sheet or film to a temperature above the glass transition temperature of the thermoplastic and then uniaxially or biaxially orienting said sheet or film to cause only then the surface of the sheet or film to exhibit the form projections (7) seen in FIG. 2 of German Pat. No. 1,504,522. Still further stretching results in the structure of FIG. 3 of said German reference wherein the sheet or film contains voids and pore spaces.

These stretched sheets or films of German Pat. No. 1,504,522 can be highly oriented and are of high crystallinity.

It is an object of this invention to provide matted and scratch resistant films or sheet which can be more easily embossed in fully portraying the desired structure.

Accordingly, the product of the present invention is a matted and scratch-resistant, amorphous to crystalline sheet or film of a film-forming thermoplastic and a filler in an amount of 2 to 25% by weight, based on the weight of polymer, said filler consisting of glass spheres of size from 0.5 to 75$\mu$, preferably 0.5 to 50$\mu$, uniformly distributed therein, said sheet or film having been extruded and taken up in an integrated two-step process whereby said sheet or film was stretched in the melt-fluid state at a decreasing temperature gradient between the temperature of the melt extrusion means and the temperature of the take-up means, and said sheet or film having a surface characterized by projecting domes of the glass spheres which are still completely covered by thermoplastic.

Preferably, the films or sheets contain 5 to 15% by weight, especially 5.5 to 12% by weight, of glass spheres and most preferably the average size of the glass spheres is 0.5 to 20$\mu$.

The films or sheets are manufactured by means of known devices from moulding compositions in which the glass spheres are uniformly distrubuted in the thermoplastic. Suitable thermoplastics are all film-forming polymers. Plastics from which very thin films can be manufactured are preferred. Particularly suitable thermoplastics for the manufacture of the films or sheets according to the invention have proved to be polyalkylene terephthalates, especially polyethylene terephthalates, and polyamides, especially polyamide 6, polyamide 6,6, polyamide 11 and polyamide 12.

The plastic moulding compositions can contain customary further additives, such as, for example, fillers, matting agents, such as micro-mica, titanium dioxide or suitable colorants. As a further matting additive, preferably 0.01 to 5%, and especially 0.1 to 2% by weight of micro-mica is admixed to the moulding composition. Furthermore, flame-proofing substances, for example tetrabromophthalic anhydride or decarbromodiphenyl can be present, optionally together with antimony trioxide. In order to prevent the films or sheets according to the invention sticking to the surfaces of the tools during manufacture or during further processing, known mould release agents, such as, for example, polyethylene, waxes or silicones, can be added to the moulding compositions.

The content and especially the size of the glass spheres depends on the film thickness and on the desired mattness. It has proved desirable that the average diameter of the glass spheres should be less than half the film thickness. To assist the flawless embedding of the glass spheres in the plastic matrix, an adhesion-promoting substance can be used in addition. In that case, the adhesion promoter can be added together with the glass spheres to the plastic, or can be applied to the surface of the glass spheres before these are mixed with the plastic. Adhesion promoters which can be used are in particular the compositions described as "sizes" which are known for binding glass fibres or glass particles to plastics in which they are embedded.

The manufacture of the films according to the invention is carried out with devices known for the purpose. To produce the films, the thermoplastic moulding compositions, which contain, uniformly distributed, 2 to 25% by weight of glass spheres of size from 0.5 to 75μ, are converted to a layer by extrusion from a slit die or circular die and stretched, while still in the melt-fluid state, to the point that the surface structure of the films or sheets is formed by projecting domes of the glass spheres, which are still completely covered by plastic.

An integrated two-step, continuous process for the manufacture of a matted and scratch-resistant, amorphous to crystalline sheet or film of a film-forming thermoplastic and a filler in an amount of 2 to 25% by weight, based on the weight of polymer, comprises extruding from an extrusion means, at the melt extrusion temperature of the thermoplastic, a thermoplastic composition containing a thermoplastic and filler, said filler consisting of glass spheres of size from 0.5 to 75μ, uniformly distributed therein, and taking-up said sheet or film on a take-up means at a temperature below the glass transition temperature of said thermoplastic, said take-up means being operated at such a rate as to cause said sheet or film to be stretched in the melt-fluid state at a decreasing temperature gradient between the temperature of the melt extrusion means and the temperature of the take-up means and to cause the surface of said sheet or film to be characterized by projecting domes of the glass spheres which are still completely covered by thermoplastic.

The degree of crystallinity of the films or sheets according to the invention can be controlled by the rate of cooling after extrusion. If rapid cooling is used, amorphous to slightly crystalline, translucent films or sheets are obtained, whilst on slower cooling predominantly more crystalline products are obtained. The amorphous to slightly crystalline films or sheets according to the invention can also be converted into films of high degree of crystallinity by a subsequent heat treatment. The amorphous to slightly crystalline films or sheets can also first be warmed and then be stretched biaxially, whereby crystalline films or sheets of increased strength are obtained.

The degree of crystallinity and of orientation in polymeric pellicles can be conveniently ascertained by X-ray diffraction techniques (Charles Tanford, Physical Chemistry of Macromolecules, John Wiley & Sons, New York, 1961, pages 37–43).

X-ray diffraction of a typical film made by the instant process would show it to be of relatively low crystallinity and low orientation. Heating such a film would convert it to high crystalinity with unchanged (low) orientation as seen by X-ray diffraction.

By contrast, an X-ray diffraction diagram of a typical uniaxially (or biaxially) oriented film stretched by the process (in the third step) of German 1,504,522 would indicate a highly crystalline film with high (or very discernible) orientation.

Thus X-ray diffraction provides another independent indication of the differences between the instant process and product compared to those of German Pat. No. 1,504,522.

The scratch-resistant film material according to the invention can be laminated to other materials, for example wood, glass, metal or other plastics, and the customary adhesion promotors can be used for this purpose. Depending on the nature of the materials, an appropriate adhesion promoter will be employed, say an adhesion promoter which can be heat-activated and which has beforehand been applied either to the film material according to the invention or to the material to which the latter is to be laminated. In the case of lamination of the films according to the invention to other plastic films, preferably, for example, of PVC, polyethylene, chlorinated polyethylene, ethylene/vinyl acetate, polystyrene or copolymers of, for example, acrylonitrile, butadiene and styrene, and alternative procedure is to extrude the films simultaneously and bond them to one another whilst still in the molten state.

The film material according to the invention can be embossed in order to apply a pattern, without changing the surface structure consisting of domes (of the spheres). Accordingly, the matting and the scratch resistance are retained even after the embossing process. The embossing can also be carried out with laminated films of the material according to the invention and other plastics. Here, the embossing is also formed on the lower film if its softening point is lower than that of the material according to the invention.

A preferred field of use for the film material according to the invention is the manufacture or veneer materials, for example for furniture manufacture, for doors or for wall claddings. For this purposes, it is possible to use the films according to the invention, provided with a veneer pattern, or to use embossed laminated films. It is also possible to laminate a film, for example of rigid PVC, which has been provided with a veneer pattern, to the film material according to the invention. In this way, a surface coating which has substantially better scratch resistance than known comparable materials is obtained in every case.

The attached FIGURE explains the invention in relation to a laminate film. In this FIGURE, 10 represents a base layer of a film-forming plastic, 12 represents an adhesive layer and 14 represents a film according to the invention.

It can be seen that spheres (16) are incorporated in the layer (14), and in particular in such a way that the surfaces of the film according to the invention have a dome structure which is characterized in that the individual spheres (16) are enclosed by a continuous skin of the plastic matrix.

The films and sheets according to the invention are matted and at the same time more scratch-resistant.

They can be easily embossed in fully portraying a desired structure, e.g., a wood-like structure, whereby the scratch-resistance and the mattness is surprisingly maintained.

The examples which follow serve to explain the invention further. The scratch resistance was determined relative to a rigid PVC film, using a missile resistance tester, type 435 from Messrs Erichsen GmbH and employing a round disc of a special plastic as the missile. The percentages quoted are percentages by weight.

EXAMPLE 1

In the course of the polycondensation of a polyethylene terephthalate (PET), 5% of glass beads of average diameter 5-15μ tradename BALLOTINI 5,000 (CP 02) were added. (These beads are manufactured by Messrs Potters Ballotoni GmbH, 6719 Kirchheimbolanden). The polycondensate was extruded on a customary slit-die film installation under conditions such that the material temperature was 270° C. at the outlet position. The melt which issues vertically from the 300μ die gap was cast onto a customary cooling roller arangement. The temperature of the first cooling roller was 70° C. The ratio of the roller speed to the outlet speed of the melt was so chosen that the film, in the melt-fluid state, was stretched uniformly in the longitudinal direction to a thickness of 30μ. The predominantly amorphous film showed a matt surface which, as was found from screen electron microscope photographs, was caused by homogeneously distributed glass beads completely surrounded by the polymeric matrix. These photograph showed that even glass spheres which project from the surface by up to 90% of their diameter, were surrounded (by matrix) without micro-flaws.

This film was laminated to a known rigid PVC film, using commercially available adhesives, and embossed at film temperatures of 150° C. under otherwise customary conditions. As a result of the prewarming before the embossing nip, the film crystallized further so that it only softens completely after exceeding the crystallite melting point at approximately 250° C.

In embossing nip itself, the coarse structure of the embossing roller was transferred under the temperature and pressure conditions prevailing in the nip, without however pressing the domes into the surface. The embossing of the film surface was thus fixed predominantly by the PVC film, without depicting the peak-to-valley heights of the embossing roller. It was possible to show, by screen electron microccope photographs, that the "dome structure" of the PET film is still present in the embossed laminate also.

The film has approximately the same degree of mattness as a rigid PVC film embossed with a mat satin finish, and has good scratch resistance. The missile resistance test showed that a rigid PVC film already showed a glossy trace under a load of 1.5 Newton force, whilst in the case of the film according to the invention no trace was detectable even at 20 Newton force.

EXAMPLE 2

A PET/glass bead mixture manufactured from the same product and by the same process, but with 15% of glass beads added, was extruded on a customary film-blowing installation, at material temperatures of approximately 265° C., from a circular die of 0.5 mm gap width to give 50μ thick films by even stretching in the melt-fluid state in two directions at right angle to one another. These films were considerably more matt than those obtained according to Example 1. The screen electron microscope photographs showed a substantially larger number of homogeneously distributed domes which were again completely surrounded by the polymer.

Lamination and embossing were carried out analogously to Example 1. The embossed laminate was considerably more matt and had comparable scratch resistance.

EXAMPLE 3

A film was extruded from a polyethylene terephthalate according to Example 1, which however additionally contained 0.1% of $TiO_2$, in accordance with the process mentioned in Example 1. The film was comparatively somewhat more matt.

The screen electron microscope photographs showed that the pigments of particle size less than 0.5μ contributed only little to light scattering on the surface, but caused increased reflection of the incident light. The lamination and embossing were carried out as indicated in Example 1.

The embossed film laminate was somewhat more matt than that described in Example 1.

EXAMPLE 4

10% of glass beads were admixed to a polycaprolactam 6,6. This product was extruded on the slit die installation described above, at material temperatures of 250° C., onto a roller cooled to plus 10° C., so as to give a predominantly amorphous film. The film, again in the plastic state, was stretched uniformly, from 300 to 30μ, in directions at right angles to one another in the melt-fluid state.

The surface structure was comparable with that mentioned in Example 1. This film was laminated and embossed in accordance with the process indicated in Example 1, using embossing temperatures of 150° C. The screen electron microscope photographs again showed the surface structure consisting of domes.

EXAMPLE 5

A two-layer film of a polyethylene terephthalate containing 10% of glass beads (Crastin XB 2813)—layer 1—and of an ethylene/vinyl acetate copolymer (EVA, VA content 32%, melt index 30 g/10 minutes)—layer 2—was produced on a slit die co-extrusion installation.

With the slit die used, the material channels for layers 1 and 2 were respectively fed by single screw extruders of 90 and 60 mm φ and the melts of the two materials were combined with one another approximately 50 mm before the end of the die. The temperatures on the extruder were so chosen that the material temperature of the polyethylene terephthalate was approximately 275° C. and that of the EVA approximately 220° C. The die temperatures were set to 280° C., resulting in a temperature of 270° C. in the melt which issued. The gap width was 0.5 mm and the final film thickness was 200μ because of the plastic stretching of the melt. The layer thickness ratio was adjusted by adjusting the feed rate so that the adhesion promotor layer was approximately 20μ thick and the surface layer approximately 180μ thick.

Because of the abovementioned plastic stretching of the melt, the dome-shaped surface, and hence the desired matting, were obtained. The second layer, which does not contain special fillers, in contrast remains completely smooth. The film manufactured is particularly suitable for lamination to other thermoplastic films on continuous laminating machines, since it is possible to avoid trapping air.

This two-layer film can furthermore also be laminated thermally or by means of known adhesive systems and processes onto other web-shaped materials, for example fleece or paper, or onto wooden materials in sheet form.

EXAMPLE 6

During the polycondensation of a polyethylene terephthalate, 5% (corresponding to Example 1) of the glass beads mentioned in Example 1 were added to one mixture, and 6% to another mixture.

1% of micro-mica was then also added to the first-mentioned mixture, containing 5% of glass beads, during extrusion processing—as described in Example 1.

The predominantly amorphous films obtained from both polymers were laminated onto printed rigid PVC films in the usual manner, and embossed at the same time. The printing inks were based on an acrylate polymer which at the same time serves as an adhesion promotor between the PET film and the rigid PVC film. The film in which 1% of micro-mica was used, the filler content being the same, has better transparency, comparable scratch resistance and greater mattness.

This higher degree of mattness and lower cloudiness is particularly important in imitating natural veneers since the film laminated onto the original printed patters should falsify the latter as little as possible.

The micro-mica used in this case was obtained via the German agent P. H. Erbsloeh, D-4 Dusseldorf, from Norwegian Talk, 5001 Bergen, Norway. O.O. 744 (type Micro Mica W 1).

EXAMPLE 7

(a) According to the procedure of Example 1 a polyethylene terephthalate film is prepared containing 10 percent by weight of glass spheres with size of approximate 5$\mu$ and being stretched in the melt-fluid state to a thickness of approximate 50$\mu$.

(b) According to the procedure of Example 1 a polyethylene terephthalate film is prepared containing 10 percent by weight of calcium carbonate with size of approximate 5$\mu$ and being stretched in the melt-fluid state to a thickness of approximate 50$\mu$ (comparison to German Pat. No. 1,504,522).

(c) A melt-extruded polyethyleneterephthalate film containing 10 percent by weight of calcium carbonate of size of approximate 5$\mu$ is stretched at a temperature of 90° C. to the three times of the original length in the horizontal and vertical directions to a thickness of approximate 50$\mu$ (comparison to German Pat. No. 1,504,522).

The following properties are determined and the results are given in Tables a, b and c.

(a) The gloss of the surface is determined visually.

(b) Writing upon the surface and resistance of this writing:

Some words are written upon the surface with a lead pencil of hardness HB. Wiping off is tested in rubbing with the finger over the words. The obliteration is tested in wiping a paper tissue over the written words.

(c) Scratch-resistance is determined according to the Erichsen method using a missile resistance tester type 435 and employing a round disc of steel or natural horn as the missile.

Table a

| product | surface appearance |
| --- | --- |
| Example 7a | matted surface |
| Example 7b | glossy surface |
| Example 7c | matted surface |

Table b

| product | behavior of the written words |
| --- | --- |
| Example 7a | The words can be wiped off and are obliterated after treating with a paper tissue so that they cannot be read |
| Example 7c | The words cannot be wiped off and are readable after treatment with a paper tissue |

Table c

| product | scratch-resistance, testing force in Newton | |
| --- | --- | --- |
|  | steel | natural horn |
| Example 7a | 10 | 8 |
| Example 7c | 4 | 2 |

It is evident from the results of Table a) that a film containing one of the solid fillers disclosed in the German Offenlegungsschrift (DT-OS) 1,504,522 must be stretched at a temperature above the glass transition temperature and below the melting point of the plastic material in order to provide a matted surface. It is also evident that the surface properties of films according to this application are totally different compared to films according to the German Pat. No. 1,504,522. Especially the scratch-resistance comparing matted films is superior.

EXAMPLE 8

(a) According to the procedure of Example 1 a polyethylene terephthalate film is prepared containing 10 percent by weight of glass spheres with size of around 5$\mu$ and being stretched in the melt-fluid state to a thickness of around 50$\mu$.

(b) A melt-extruded polyethylene terephthalate film containing 10 percent by weight of glass spheres with size of around 5$\mu$ is stretched at a temperature of 100° C. to the three times of the original length in the horizontal and vertical direction to a thickness of around 50$\mu$.

A wood-structure is embossed on the films of (8.a) and (8.b) with a platen-press at a pressure of 3 to 4 kp/cm$^2$ during 1 minute and at different temperatures of 80°, 100°, 120° and 140° C.

Results (a) The films of (8.a) according to the present invention are uniformly matted.

(b) The films of (8.b) which are prepared according to the procedure of the German Offenlegungsschrift No. 1,504,522 are essentially muddier or opaquer than the films of (8.a) and the surface of these films is completely covered by brilliant spots which remain also after embossing. These films are therefore not fully matted.

(c) The embossing behaviour of the films of (8.a) is far superior to that of the films of (8.a) at all used temperatures. The wood-structure is totally insufficient portrayed in the surface of the films of (8.b) at all used temperatures whereas this structure is completely portrayed on the films of (8.a) even at a temperature of 80° C.

It is evident from these results that completely matted films cannot be obtained according to the procedure of the German Offenlegungsschrift 1,504,522 when glass spheres are used as a filler. It is also evident that the embossing behaviour of the films according to the present invention is far superior.

What we claim is:

1. A matted and scratch-resistant, amorphous to crystalline sheet or film of a film-forming thermoplastic and a filler in an amount of 2 to 25% by weight, based on the weight of polymer, said filler consisting of glass spheres of size from 0.5 to 75μ, uniformly distributed therein, said sheet or film having been extruded and taken up in an integrated two-step process whereby said sheet or film was stretched in the melt-fluid state at a decreasing temperature gradient between the temperature of the melt extrusion means and the temperature of the take-up means, and said sheet or film having a surface characterized by projecting domes of the glass spheres which are still completely covered by thermoplastic.

2. A sheet or film according to claim 1, characterized in that the glass spheres are bonded to the thermoplastic by an adhesion promotor.

3. A sheet or film according to claim 1, in which the thermoplastic is a polyalkylene terephthalate.

4. A sheet or film according to claim 3, in which the thermoplastic is a polyethylene terephthalate.

5. A sheet or film according to claim 1, in which the thermoplastic is a polyamide.

6. A sheet or film according to claim 4, in which the thermoplastic is polyamide 6, polyamide 6,6, polyamide 11 or polyamide 12.

7. A sheet or film according to claim 1 which contains 5 to 15% by weight of glass spheres.

8. A sheet or film according to claim 1 which contains 5.5 to 12% by weight of glass spheres.

9. A sheet or film according to claim 1 characterized in that the glass spheres are of a size from 0.5 to 50μ.

10. A sheet or film according to claim 1 characterized in that the glass spheres have an average size of 0.5 to 20μ.

11. A sheet or film according to claim 1, characterized in that a further matting agent is present.

12. A sheet or film according to claim 11, characterized in that 0.01 to 5% by weight, relative to the polymer, of micro-mica is present.

13. A sheet or film according to claim 1, which is additionally embossed while still retaining in the embossed state a matted and scratch-resistant surface characterized by a structure in which domes of the glass spheres which project from the surface of said sheet or film are completely covered by the thermoplastic.

14. An integrated two-step continuous process for the manufacture of a matted and scratch-resistant, amorphous to crystalline sheet or film of a film-forming thermoplastic and a filler in an amount of 2 to 25% by weight, based on the weight of polymer, comprising extruding from an extrusion means, at the melt extrusion temperature of the thermoplastic, a thermoplastic composition containing a thermoplastic and filler, said filler consisting of glass spheres of size from 0.5 to 75μ, uniformly distributed therein, and taking-up said sheet or film on a take-up means at a temperature below the glass transition temperature of said thermoplastic, said take-up means being operated at such a rate as to cause said sheet or film to be stretched in the melt-fluid state at a decreasing temperature gradient between the temperature of the melt extrusion means and the temperature of the take-up means and to cause the surface of said sheet or film to be characterized by projecting domes of the glass spheres which are still completely covered by thermoplastic.

15. A process according to claim 14, characterized in that the glass spheres are of size from 0.5 to 50μ.

16. A process according to claim 14, characterized in that the glass spheres have an average size of 0.5 to 20μ.

* * * * *